United States Patent [19]

Noborio et al.

[11] 4,208,432
[45] Jun. 17, 1980

[54] POWDERY ANTI-STICK AGENT FOR KEEPING THE STICKY SURFACE OF CANDY OR CHEWING GUM NON-ADHESIVE

[75] Inventors: Ken-Ichi Noborio, Nishinomiya; Masao Maeda, Itami, both of Japan

[73] Assignee: Kanebo Foods, Ltd., Tokyo, Japan

[21] Appl. No.: 865,336

[22] Filed: Dec. 28, 1977

[30] Foreign Application Priority Data

Jun. 13, 1977 [JP] Japan .................................. 52-70242

[51] Int. Cl.$^2$ ........................... A23G 3/00; A23G 3/30
[52] U.S. Cl. .......................................... 426/4; 426/97; 426/103; 426/660
[58] Field of Search ...................... 426/96, 97, 99, 103, 426/302, 307, 471, 289, 295, 4, 660

[56] References Cited

U.S. PATENT DOCUMENTS

| | | | |
|---|---|---|---|
| 2,076,112 | 4/1937 | Barker | 426/4 |
| 2,913,342 | 11/1959 | Cameron et al. | 426/103 X |
| 2,970,915 | 2/1961 | Ferrari et al. | 426/97 X |
| 3,052,560 | 9/1962 | Delaney | 426/99 |
| 3,285,750 | 11/1966 | Ishida et al. | 426/4 |
| 3,291,614 | 12/1966 | Tumerman et al. | 426/99 |
| 3,293,043 | 12/1966 | Matz et al. | 426/307 |
| 3,295,992 | 1/1967 | Frey | 426/660 |
| 3,734,748 | 5/1973 | Veno et al. | 426/307 X |
| 3,974,293 | 8/1976 | Witzel | 426/4 |
| 3,984,574 | 10/1976 | Comollo | 426/4 |

*Primary Examiner*—Robert A. Yoncoski
*Attorney, Agent, or Firm*—Cushman, Darby & Cushman

[57] ABSTRACT

A powdery anti-stick agent for keeping the surface of a sticky surface of candy or chewing gum non-adhesive, comprising: a compound selected from a group consisting of α-lactose, β-lactose, calcium carbonate and mixtures thereof coated with a compound selected from a group consisting of saturated fatty acid monoglycerides and derivatives thereof. A process for producing the above powdery releasing agent.

8 Claims, No Drawings

POWDERY ANTI-STICK AGENT FOR KEEPING THE STICKY SURFACE OF CANDY OR CHEWING GUM NON-ADHESIVE

BACKGROUND OF THE INVENTION (a) Field of the Invention

The present invention relates to an inexplosive and innoxious powdery releasing agent for keeping the surface of a sticky surface of candy or chewing gum non-adhesive, and more particularly, it pertains to such agent described above which is applicable to edible materials and chewing materials.

(b) Description of the Prior Art

In the production of articles of taste such as chewing gum, caramel, or fudge and so on from viscous edible materials, there have been used a powdery or liquid releasing agent to facilitate the removal of a molded article from a mold, and to facilitate the cutting of the article into pieces of an appropriate size, and also to keep the sticky surface of such piece non-adhesive to its wrapping sheet. Such powdery releasing agent usually includes crystalline saccharoid, starch, calcium carbonate, talc, magnesium stearate, calcium stearate and the like. As liquid releasing agents, there have been extensively used edible oils and fats, liquid edible emulsifiers and the like. However, powder of crystalline saccharoid, starch and calcium carbonate are poor in ductility (malleability) and lubricating property so that such powder requires to be spreaded in a large amount on the entire contacting surfaces of a mold and of a viscous material charged therein for facilitating the removal of the molded article off the mold, or on the entire surfaces of the thus removed article to facilitate its handling for subsequent treatments. The use of a large amount of such powdery releasing agent inevitably is accompanied by spontaneous scattering of a considerable amount thereof in the ambient air, causing adverse effects in terms of economy and sanitation for the workers engaged in the production of the aimed cakes. Especially, a powder of magnesium stearate has the tendency to be electrostatically charged and is susceptible to causing explosion when scattered in the ambient air. Moreover, powdery crystalline saccharoid is disadvantageously hygroscopic so that the surfaces of commercially produced article tend to become moist and damp when the article covered with this powder is left to stand for an extended period of time. Starch is poor in solubility in an aqueous medium at low temperature. Moreover, starch undesirably has a unique odor and this odor will act so as to deprive the desired fragrance of the article and to make the product rejectable due to the resulting modified smell.

Furthermore, in case a powder of calcium carbonate alone is used as a releasing agent, there is the tendency that the amount of this powder required for the releasing purpose becomes large owing to such reasons as described above. Especially when this powder is used for edible candy or chewing gums, the amount of this powder used to keep the article in commercially acceptable condition for subsequent treatment and storage tends to be considerably great. Thus the amount of the powder at the time the article is brought into a mouth of a person would exceed the upper limit which is defined by the official rules for food additives. In case of chewing gum, the amount of such additive powder as calcium carbonate which is allowed to be used is 2% or less by weight. For other foods, the permissible amount of calcium carbonate is designated to be 1% or less by weight.

Powder of talc, itself, has an effective releasing property due to its ductility (malleability) and lubricating property. However, talc is used ordinarily in the form of a very fine powder. Accordingly, there is the risk that a considerable amount of powder becomes afloat in the ambient air to effect the working environment. Moreover, talc powder has frequently to be used in such an amount over the upper limit defined by the rules for food additives to obtain effective releasability and storageability in acceptable conditions at the time the product is brought into the mouth of a person. According to such rules, the officially designated limit of talc powder to be used is 0.5% or less by weight as an additive to food materials. Thus, the use of an excessively large amount of talc powder will be problematical from the point of view of the food sanitation requirements.

Still further, in case crystalline saccharoid or starch is used by coating it with saturated fatty acid monoglyceride or a derivative thereof, the releasability and the lubricating property of such agent will become improved. However, such enclosed saccharoid or starch still has drawbacks in terms of stability during an elongated time period and of odor which are required for marketing the products.

As such, there has been a demand for a releasing agent having a satisfactorily long stability and having no rejectable odor when enclosed in a coating substance.

On the other hand, liquid edible fats and oils and liquid edible emulsifiers to be used as releasing agents are, of course, liquid at room temperature so that the surfaces of products coated with these releasing agents are held in the moist state, giving an appearance like an aged food material if the product is food, and also a tendency to stick to wrapping sheets such as paper, coated film or metalized paper. In some cases, the liquid releasing agents may disadvantageously tend to penetrate into the body of the products with the lapse of time, and may cause rancidity to generate rejectable odor and taste.

SUMMARY OF THE INVENTION

In order to overcome the above difficulties and disadvantages encountered in known releasing agents, there is provided, according to the present invention, an inexplosive and innoxious powdery releasing agent which is capable of effectively and efficiently allowing the removal of a sticky article off a mold, and which has an excellent stability during an extended use.

That is, an object of the present invention is to provide a powdery releasing agent of the type as described above for use in the production and preservation of, for example, shaped food and chewing materials, which agent is tasteless, odorless and not harmful for the health of human being and satisfies the rules for food additives, and which has a less scattering and flying tendency during its handling without the accompaniment of any risk of becoming electrostatically charged or of explosion, and which has excellent lubricating and releasing properties and long-standing stability with no degradation.

Another object of the present invention is to provide a process for producing the powdery releasing agent as described above.

DETAILED DESCRIPTION OF THE PREFERRED EMBODIMENTS

The above object can be achieved according to the present invention by providing a releasing agent comprising a compound selected from a group consisting of α- and β-lactoses, calcium carbonate and mixtures thereof, which are coated with saturated fatty acid monoglycerides or derivatives thereof.

Saturated fatty acid monoglycerides and derivatives thereof which are used in the present invention include those monoglycerides containing a saturated fatty acid moiety having at least 12 carbon atoms and mono- or di-acetylation products of saturated fatty acid monoglycerides having an acid value of 2 or less and an iodine value of 2 or less.

Saturated fatty acid monoglyceride includes lauric acid monoglyceride (glycerol monolaurate), palmitic acid monoglyceride (glycerol monopalmitate), stearic acid monoglyceride (glycerol monosterate) and the like. Mono- or di-acetylation products of saturated fatty acid monoglycerides include monostearomonoacetyl glyceride, monolauro-diacetyl glyceride and the like. Among them, stearic acid monoglyceride, monostearo-monoacetyl glyceride and monolauro-diacetyl glyceride are especially preferable because they are advantageous in terms of cost, and lubricating and releasing properties.

According to the present invention, fine particles of a compound selected from a group consisting of α- and β-lactoses, calcium carbonate and mixtures thereof are coated with a compound selected from a group consisting of saturated fatty acid monoglycerides and derivatives thereof in a coating amount of 2 to 5% by weight, preferably 3 to 4% by weight, based on the weight of the compound which is to be coated. If the coating amount is less than 2% by weight, the lubricating and releasing abilities of resulting coated particles are unacceptably reduced. If the coating amount is higher than 5% by weight, coated particles unpreferably have an excessive flowing property so that they may non-uniformly spread on the contacting surfaces of a mold and also on the surfaces of the material charged in the mold for being shaped, adversely affecting the release of the product from the mold.

The coated particles of the above-stated releasing agents of the present invention for use in shaping food materials or chewing materials including confectionary foods such as candies and chewing gums, have a particle size of 100 mesh or less, preferably 150 to 200 mesh. If the particle size is higher than 100 mesh, the particles are too rough to spread uniformly on the contacting surfaces of a mold and also on the surfaces of the material charged therein, so that the charged material would still tend to stick partly at such interfaces as not containing enough particles between the contacting surfaces of both the material and the mold, resulting, in other words, a reduction in the lubricating and releasing abilities of the particles. Thus, when the shaped material is cut into an appropriate size, the cut segments would stick to one another at the surfaces of the cut ends. Moreover, such large particles of releasing agent coated on edible materials or chewing materials give an unattractive feeling of coarseness to one's mouth.

The particles of releasing agents for use in the production and preservation of shaped edible and chewing materials according to the present invention may be produced by emulsifying a compound selected from a group consisting of α-lactose, β-lactose, calcium carbonate and mixtures thereof together with a compound selected from a group of consisting saturated fatty acid monoglycerides, derivatives thereof and mixtures thereof in water and atomizing the emulsion at an appropriate temperature to produce dried coated particles. The atomizing temperature depends upon thermal stabilities of α- or β-lactose, calcium carbonate, saturated fatty acid monoglycerides or derivatives thereof which are used. Hydrated α-lactose has a melting (decomposition) point of about 203° C. and a property of gradually losing crystal water at a temperature of 120° to 130° C. to produce hygroscopic α-lactose anhydride which is undesirable for use as a releasing agent. β-lactose is usually of anhydride and has a melting point of about 252° C. and a property of absorbing water at room temperature to produce α-lactose hydrate. Therefore, the present invention encompasses such transformation from β-lactose to α-lactose hydride which may occur during preparation of the emulsion in water and atomization thereof. The present invention also encompasses the transformation of α-lactose hydride to α-lactose anhydride during atomization of the emulsion if the latter is produced only in such a small amount as not giving deleterious effect on the releasing and preservation properties of the resulting particles. However, the atomizing temperature should be preferably lower enough to minimize the production of α-lactose anhydride. Therefore, the atomizing temperature should be lower than 120° C., preferably 50° C. to 120° C., and more preferably 80° to 100° C. However, if only a short time period is required for atomizing the emulsion, temperatures higher than 120° C. may be used during the period, provided that produced α-lactose anhydride is negligible or not so much as deleteriously affecting the properties of the product particles. An amount of water to be used for preparing the emulsion may vary in a wide range depending upon the drying effect exhibited by the atomizing device. However, it should be as little as possible to facilitate the drying of coated particles, provided that the core particles of a compound selected from a group consisting of α-, β-lactoses, calcium carbonate and mixtures thereof are coated with a compound selected from a group consisting of saturated fatty acid monoglycerides and derivatives thereof.

The coated particles of releasing agents according to the present invention are tasteless, odorless and harmless for one's health, which consist of cores of α-, β-lactoses and/or calcium carbonate coated with saturated fatty acid monoglycerides and/or derivatives thereof. The α- and β-lactoses have an appropriate solubility in water. Calcium carbonate is tasteless and odorless and superior in long-standing stability, and can be used as an eutrophic. Moreover, calcium carbonate can be used as a releasing agent in an amount within the range defined under the rules for food additives, if it is treated to be afforded a lubricating property. The saturated fatty acid monoglycerides and derivatives thereof which are used as coating material have a high lubricating property. Therefore, the coated particles of the present invention have an improved ductility and an improved releasing property, so that they can uniformly cover the surfaces of a material charged in a mold even with a small amount of the particles in the production of shapes of very viscous edible materials or chewing material, and that they allow the cutting of shaped materials without causing any stickiness at the surfaces of the cut edges of the materials. Moreover, they have a less tendency to be scattered and to float in ambient air during their handling. Thus, the production of cakes of food or chewing stuff can be easily conducted by using the releasing agent particles provided according to the present invention.

The releasing agent particles of the present invention may be used in a mixture with known powdery releasing agents.

The releasing agent particles for use in shaping edible materials or chewing materials which are produced according to the present invention as described above are tasteless, odorless and harmless for one's health, and has a less tendency to be scattered and to float in the ambient air during processing operations, and has a high lubricating property, a high releasing property and a high stability for an extended period of time. Therefore, they are of high utility value and can be applied to a wide variety of use and purposes, though in this specification there are mentioned only instances where the invention is applied to chewing gum.

The present invention will hereunder be described with respect to the following examples, wherein parts of percentages (%) are based upon weight.

Tests on releasing ability and durability referred to in the following examples are carried out in a manner as follows:

(a) Releasing Ability Test

After coating all the surfaces of a rectangular sample of 17 cm×10 cm+1 cm with 5 g of a releasing agent, the rectangular sample is passed through a clearance between rollers of 5 mm and examined for the presence of markings of sticking. This cycle is repeated ten times. Releasing ability is evaluated by an average value calculated with "non-sticking" representing three points, "spot-sticking" two points, "partial face-sticking" one point and "overall face-sticking" zero, and counting fractions 0.5 and over as unity and disregarding the smaller fractions.

(b) Durability Test

After leaving ten completely enveloped product samples to stand in a chamber maintained at the temperature of 35° C. and relative humidity of 80% for two weeks, the samples are evaluated as to durability by examining the presence of marking of sticking on the envelopes with the same basis as that for the evaluation of releasing ability described above. Moreover, evaluation of odor is conducted by relying on the sense of smell of the testing persons.

EXAMPLE 1

One hundred parts of $\beta$-lactose and 4 parts of stearic acid monoglyceride are emulsified with 150 parts of warm water. Thereafter, the emulsion is atomized at a temperature of 100° C. to produce releasing agent particles each having an average size of 150 mesh.

EXAMPLE 2

The procedure of Example 1 is repeated, except that stearic acid monoglyceride is replaced by monolaurodiacetyl glyceride, to produce coated releasing agent particles.

EXAMPLE 3

The procedure of Example 1 is repeated, except that $\beta$-lactose and stearic acid monoglyceride are replaced by calcium carbonate and monostearo-monoacetyl glyceride, respectively, to produce coated releasing agent particles.

EXAMPLE 4

The procedure of Example 1 is repeated, except that stearic acid monoglyceride is replaced by palmitic acid monoglyceride, to produce coated releasing agent particles.

EXAMPLE 5

The procedure of Example 1 is repeated, except that stearic acid monoglyceride is replaced by monostearodiacetyl glyceride, to produce coated releasing agent particles.

CONTROL 1

Tricapryl glyceride is used as a liquid releasing agent.

CONTROL 2

A mixture of 50 parts of powdery sugar having a particle size of about 150 mesh and 50 parts of starch is used as a powdery releasing agent.

CONTROL 3

Calcium carbonate having a particle size of about 150 mesh is used as a releasing agent.

CONTROL 4

$\beta$-lactose having a particle size of about 150 mesh is used as a releasing agent.

CONTROL 5

A mixture of 100 parts of $\beta$-lactose having a particle size of 160 mesh and 3 parts of stearic acid monoglyceride is used as a releasing agent.

Results obtained by testing above releasing agents as to releasing ability and durability with chewing gum are summerized in the following Table 1.

Table 1

| Sample Item | Example 1 | Example 2 | Example 3 | Example 4 | Example 5 | Control 1 | Control 2 | Control 3 | Control 4 | Control 5 |
| --- | --- | --- | --- | --- | --- | --- | --- | --- | --- | --- |
| Just after production: | | | | | | | | | | |
| Releasing | 3 | 3 | 3 | 2 | 2 | 3 | 0 | 1 | 1 | 1 |
| Sticking to Envelope | 3 | 3 | 3 | 3 | 3 | 2 | 2 | 2 | 2 | 2 |
| Odor | none | none | none | none | none | a little | yes | none | none | none |
| After two weeks: | | | | | | | | | | |
| Sticking to Envelope | 3 | 3 | 3 | 3 | 3 | 1 | 0 | 0 | 0 | 0 |

Table 1-continued

| Item | Sample | Example 1 | Example 2 | Example 3 | Example 4 | Example 5 | Control 1 | Control 2 | Control 3 | Control 4 | Control 5 |
|---|---|---|---|---|---|---|---|---|---|---|---|
| Odor | | none | none | none | none | none | yes | yes | none | none | none |

As will be apparent from the above-mentioned results, Examples 1 to 5 (the products according to the present invention) are superior in releasing and lubricating properties as well as in stability for an extended period of time as compared to Controls 1 to 5. Therefore, Examples 1 to 5 attain the object of the present invention. Moreover, Examples 1 to 3 are noted to be superior in releasing and lubricating properties to Examples 4 to 5.

What is claimed is:

1. A solid candy or chewing gum having the outer surface coated with an effective amount of a powdery anti-stick agent to keep the stick surface of the candy or chewing gum non-sticking; said powdery anti-stick agent comprising fine particles of a base compound (1) selected from the group consisting of α-lactose, β-lactose, calcium carbonate and mixtures thereof coated with a coating compound (2) selected from the group consisting of solid monoglycerides of a saturated fatty acid having 12 to 18 carbon atoms and mono- or diacetylation products of said saturated fatty acid monoglycerides; said coating amount present in about 2 to 5% by weight based on the weight of the base compound (1).

2. A product according to claim 1 wherein chewing gum is coated with the anti-stick agent.

3. A product with an anti-stick agent according to claim 1, in which said coating amount is about 3 to 4% by weight.

4. A product with an anti-stick agent according to claim 1, having a particle size of 100 mesh or less.

5. A product with an anti-stick agent according to claim 4, having a particle size of 150 mesh to 200 mesh.

6. A product with an anti-stick agent according to claim 1 wherein compound (1) comprises β-lactose.

7. A product with an anti-stick agent according to claim 1 wherein compound (1) comprises α-lactose.

8. A product with an anti-stick agent according to claim 1 wherein compound (1) comprises calcium carbonate.

* * * * *